United States Patent [19]

Delepierre-Massue et al.

[11] Patent Number: 5,880,356
[45] Date of Patent: Mar. 9, 1999

[54] DEVICE FOR PRESSURIZING A UNIFIED TWO-LIQUID PROPULSION SUBSYSTEM GEOSTATIONARY SATELLITES

[75] Inventors: Olivier Delepierre-Massue, Marseilles; Claude Fevrier, Mágnanville; Roland Salome, Labege; Pierre Le Torrivellec, St Agne, all of France

[73] Assignee: Centre National D'Etudes Spatiales, Paris, France

[21] Appl. No.: 875,699

[22] PCT Filed: Feb. 21, 1996

[86] PCT No.: PCT/FR96/00278

§ 371 Date: Jul. 11, 1997

§ 102(e) Date: Jul. 11, 1997

[87] PCT Pub. No.: WO96/26108

PCT Pub. Date: Aug. 29, 1996

[30] Foreign Application Priority Data

Feb. 20, 1995 [FR] France ................... 95 02042

[51] Int. Cl.$^6$ ............... B64G 1/40; G01F 17/00
[52] U.S. Cl. ................... 73/37; 73/149; 244/172
[58] Field of Search ............ 73/37, 290 R, 73/302, 427, 149; 244/172, 169

[56] References Cited

U.S. PATENT DOCUMENTS

| | | | |
|---|---|---|---|
| 1,885,926 | 11/1932 | Lewis ................... | 73/290 R |
| 2,378,849 | 6/1945 | Helleberg et al. ........... | 73/290 |
| 3,234,785 | 2/1966 | Rimsha ................. | 73/113 |
| 4,148,334 | 4/1979 | Richards ................ | 137/389 |
| 4,485,794 | 12/1984 | Kimberly et al. .......... | 123/569 |
| 4,619,284 | 10/1986 | Delarue et al. ............ | 137/67 |
| 4,987,775 | 1/1991 | Chobotov ............... | 73/149 |
| 5,158,362 | 10/1992 | Brauer et al. ............. | 374/33 |
| 5,263,666 | 11/1993 | Hubert et al. ............ | 244/172 |

FOREIGN PATENT DOCUMENTS 2629913 10/1989 France .
8806777 7/1988 Germany .

OTHER PUBLICATIONS

Journal Of Propulson And Power, vol. 8, No. 1, Jan. 1992, New York, pp. 74–79, Tso Ping Yeh: "Bipropellant Propulsion Performance and Propellant–Remaining Prediction for INSAT–1B".

Journal Of Spacecraft And Rockets, vol. 30, No. 1, Jan. 1993, New York, pp. 92–101, M. V. Chobotov et al., "Low–Gravity Propellant Gauging System for Accurate Predictions of Spacecraft End–of–Life".

*Primary Examiner*—Hezron Williams
*Assistant Examiner*—J. David Wiggins
*Attorney, Agent, or Firm*—Pearne, Gordon, McCoy & Granger LLP

[57] ABSTRACT

The invention relates to a device for pressurizing a standardized two-liquid propulsion system of a geostationary satellite comprising a high pressure helium storage unit (10) having at least one helium storage tank, a regulating unit (11) and a pressurizing unit for propellant tanks (17, 18) interconnected by a pressurizing circuit, wherein the regulating unit is an electronic regulating unit comprising at least one electrovalve (51), positioned at a location of the pressurizing circuit and controlled by a processing and control circuit (54), which receives informations from pressure sensors (43, 47, 48) associated with the different tanks, said processing and control circuit permitting a constant pressure pressurization of the propellant tanks (17, 18) by flow lines including a combination of pyrotechnic valves, filter elements and calibrated leak elements during the satellite transfer and placing in position phase and a measurement of the residual propellant quantity during the orbital life phase of the satellite so as to predict satellite End of Life to within 2 months out of a 15 year mission.

15 Claims, 3 Drawing Sheets

DEVICE FOR PRESSURIZING A UNIFIED TWO-LIQUID PROPULSION SUBSYSTEM GEOSTATIONARY SATELLITES

DESCRIPTION

1. Technical Field

The present invention relates to a device for pressurizing a standardized two-liquid propulsion subsystem of a geostationary satellite.

2. Prior Art

Telecommunications satellites are placed on an orbit in the earth's equatorial plane at approximately 36,000 kilometres from the earth. This circular orbit has the special feature that any satellite object on this orbit has a 24 hour rotation period around the earth. Thus, such an object appears stationary above the earth for an observer on earth. This preferred orbit enables telecommunications satellites to best fulfil their communication relay function between several points on earth.

In order to inject a satellite into its final orbit and keep it there during its useful life, propulsion means must be provided. Standardized subsystems are now used in a general manner. A tendency occurring at present consists of providing a standardized propulsion subsystem, which injects the satellite into its final orbit from its initial or transfer orbit and then keeps the satellite in position.

In such a standardized two-liquid propulsion subsystem, the liquid bi-propellant engine or motor is supplied from the same tanks and primary circuits as the other engines necessary for attitude and orbit control. As a result the transfer phase must take place with the propulsion system under a regulated helium pressure of approximately 18 bars and which is stored in high pressure tanks and once placed in position, the apogee engine and helium source are isolated from the remainder of the subsystem, which then operates at a decreasing pressure as the propellants are consumed in the main tanks. Generally, use is made of two propellants, e.g. monomethyl hydrazine (MMH) as the fuel and nitrogen peroxide ($N_2O_4$) as the oxidizer.

Up to now most geostationary telecommunications satellites use such a standardized two-liquid propulsion subsystem.

The user to whom a precise position on the geostationary orbit has been allocated, only wishes to keep on this position satellites which are effective for his particular communications traffic system. Therefore, he regularly replaces any satellite which has become obselescent by a new satellite. The obselescent satellite must then be sent into an orbit where it will not interfere with the new satellites or those around it, when its obsolescence has been established, in order to optimize the profitability of the system installed.

The most frequent reason for ending the life of the satellite is that it has consumed all the propellants maintaining it in position and its pointing towards the earth.

During the satellite life, a significant part of the propellant mass carried is burned in the apogee engine, whose aim is to increase the speed vector of the satellite in order to pass it from an elongated, elliptical orbit known as the transfer orbit to the circular orbit at an altitude of 36,000 km.

Once placed in its orbital position, the satellite is subject to disturbance forces (lunar/solar gravity, solar radiation pressure, etc.), which tend to make it describe cyclic movements with a decreasing amplitude around the initial position. As the ground stations are pointed towards a fixed point in the sky, in order to avoid overequipping the ground stations with satellite tracking means, and in order to keep the satellite in the allocated orbital position, it is necessary to periodically intervene in order to oppose interfering movements of the satellite, by periodically burning a quantity of propellants in the orbit control motors. The satellite is also exposed round its centre of gravity to disturbance torques, which would lead to the depointing thereof. Thus, a quantity of propellants is also periodically burned in the attitude control motors.

The user needs to know the satellite obsolescence date sufficiently well in advance in order to be able to initiate the activities necessary for its replacement. Thus, the satellite operator must be able to reliably predict the end of propellant consumption, so as to be able to activate the orbit ejection operation. If the information system is not precise, the greater the imprecision of the means the greater the satellite use loss and marketing time loss.

Various prior art devices aim at solving these problems. An article entitled "Low-gravity propellant gauging system for accurate predictions of spacecraft end-of-life" by M. V. Chobotov and G. P. Purohit (Journal of Spacecraft and Rockets, vol. 30, No. 1, January/ February 1993) describes a system for evaluating the propellant in a low gravity environment and predict the end of life of a satellite to within plus/minus two months, at half life for a nominal mission of fifteen years in the case of geosynchronous satellites. The system comprises two pressure sensors, i.e. one for each tank, and an interconnection locking valve between the two tanks, which are respectively the propellant and pressurized gas (helium) tanks in the satellite propulsion system. In order to carry out a propellant measurement, the propellant tank is repressurized by a brief opening of the interconnection valve between the pressurized tank at a relatively higher pressure and the propellant tank. The interconnection valve is closed again prior to the equalling out of the pressure between the two tanks in order to allow the performance of multiple measurements during the satellite mission. The measurements of the pressures and temperatures of the tanks before and after repressurization make it possible to determine the residual gas volume in the propellant tank by calculation according to the law of gases. On the basis of the knowledge of this volume and the total volume of the propellant tanks, it is possible to deduce the liquid volume present and consequently the available propellant mass.

German patent application DE-8 806 777 describes a zero-gravity measurement device for the liquid quantity, particularly the propellant quantity in tanks of satellites, in which a propellant tank is connected to a compressed gas tank by means of a pressurized gas supply line, in which is installed a measuring device giving the gas quantity transferred during the, implementation of the device. A shutoff or interconnection valve makes it possible to maintain a pressure in the tank containing the compressed gas higher than that of the propellant tank. A pressure sensor also determines the pressure of the gas contained in the propellant tank.

French patent application 91 15441 of 12.12.1991 describes a device for the periodic measurement of the residual liquid volume in a pressurized sealed tank containing a liquid, which is progressively drawn off, and a gas slightly soluble therein, which comprises a pressurized gas source, a reducing regulator supplying the tank and constructed so as to permanently prevent the pressure in the tank from dropping below a given value P, means permitting the admission of gas under a pressure P+ΔP into the tank through a constriction and means for measuring the passage time of the internal pressure from P to P+ΔP.

French patent application 2 629 913 describes a process for evaluating the residual fuel quantity in the tank of a spacecraft placed in orbit, according to which determination takes place of the gas volume in the fuel tank at a given instant and this quantity is deducted from the total volume of said tank. A first pressure measurement P1, P2 takes place at the outlet of the pressurization tank and the inlet of the fuel tank and a first temperature measurement T at a predetermined time during the space mission, followed by a second pressure measurement P' and a second temperature measurement T' after directly linking the outlet of the pressurized gas tank and the inlet of the fuel tank, the measurements of pressure P1, P2, P' and temperature T, T' serving to determine the gas volume in the fuel tank. The system permitting the performance of this process comprises:

a line directly connecting the pressurization gas tank and the inlet of the fuel tank, said line containing a venturi, a first valve responding to a control signal to permit the introduction of the pressurization gas into the line at the start of the space mission, a second valve responding to a control signal for closing the communication between the line and the fuel tank at a predetermined instant during the space mission, a first pressure transducer connected in order to measure the pressure P1, $\Delta$P1 upstream of the first valve and a second pressure transducer for measuring the pressure P2, $\Delta$P2 downstream of the second valve.

In the prior art devices, pressure regulation during the transfer phase still takes place by means of a mechanical pressure reducing regulator (sometimes redundant in series).

However, the measurement of residual propellants during the orbital life phase takes place by means of independent valves connected in parallel to the main, regulated pressurization line. The pressurization of the two-liquid propulsion subsystem of the satellite and the measurement of the quantity of residual propellants take place during said orbital life phase by a repressurization (or reinflation) method.

The object of the invention is not the measuring method used, which is that described in French patent application FR-A-2 629 913 (Gindre) and in the article entitled "Low-gravity propellant gauging system for accurate predictions for spacecraft end-of-life", analyzed hereinbefore.

The object of the invention is in fact to ensure by a single (redundant) subassembly of valves and calibrated orifices, the two regulated pressurization functions during the transfer phase and the placing in position of the satellite and reinflation during the orbital life phase.

DESCRIPTION OF THE INVENTION

The present invention proposes a device for pressurizing a standardized two-liquid propulsion system of a geostationary satellite comprising a high pressure helium storage unit having at least one helium storage tank, a regulating unit and a pressurizing unit for propellant tanks interconnected by a pressurizing circuit, characterized in that the regulating unit is an electronic regulating unit comprising at least one electrovalve, positioned at a location of the pressurizing circuit and controlled by a processing and control circuit, which receives informations from pressure sensors associated with the different tanks, said processing and control circuit permitting a constant pressure pressurization of the propellant tanks during the satellite transfer and placing in position phase and a measurement of the residual propellant quantity during the orbital life phase of the satellite.

Advantageously, the helium storage tanks communicate with the fuel tank and the oxidizer tank by means of several lines. In a first line is inserted a first pyrotechnic valve, a first filter, a second and third pyrotechnic valves in parallel, each being placed in series with a calibrated leak element. In a second and a third lines are inserted a check valve, a fourth or sixth pyrotechnic valve and a fifth or seventh pyrotechnic valve separated by a second or third filter.

The helium storage circuit is completed by a ground filling and draining valve, a test connector and a pressure system. The pressurization unit is completed by test connectors and pressure sensors.

In an embodiment the electrovalves are respectively placed between the second (and third) pyrotechnic valve and the calibrated leak element corresponding thereto between the second filter and the fifth pyrotechnic valve and between the third filter and the seventh pyrotechnic valve. The processing and control circuit receives informations from pressure sensors associated with the helium tanks and pressure sensors associated with the propellant tanks.

In another embodiment the device according to the invention has at least two fuel tanks and at least two oxidizer tanks, the elements of the second and third lines associated with the first tanks then being duplicated. Therefore the pyrotechnic valves and branch elements, illustrated in FIG. 4 with an apostrophe are relative to a configuration of the propulsive subsystem having more than two propellant tanks.

The device according to the invention, in its constant pressurization function, can be likened to an electronic regulator. It in particular has the advantage of permitting an adjustment or modification in flight of the regulated pressure thresholds, which is impossible with a mechanical regulator During the orbital life phase, the electrovalves ensure the isolation or separation of the high pressure helium part in the propellant tanks with a requisite sealing level. The measurement of the residual propellants in each tank can take place at regular intervals during the orbital life. By an opening/closing of electrovalves, it consists of reintroducing helium into the propellant tanks. The knowledge of the pressure variations supplied by the sensors then provides information on the free volume and consequently that of liquid present in the propellant tanks.

DETAILED DESCRIPTION OF EMBODIMENTS

Figure 1:
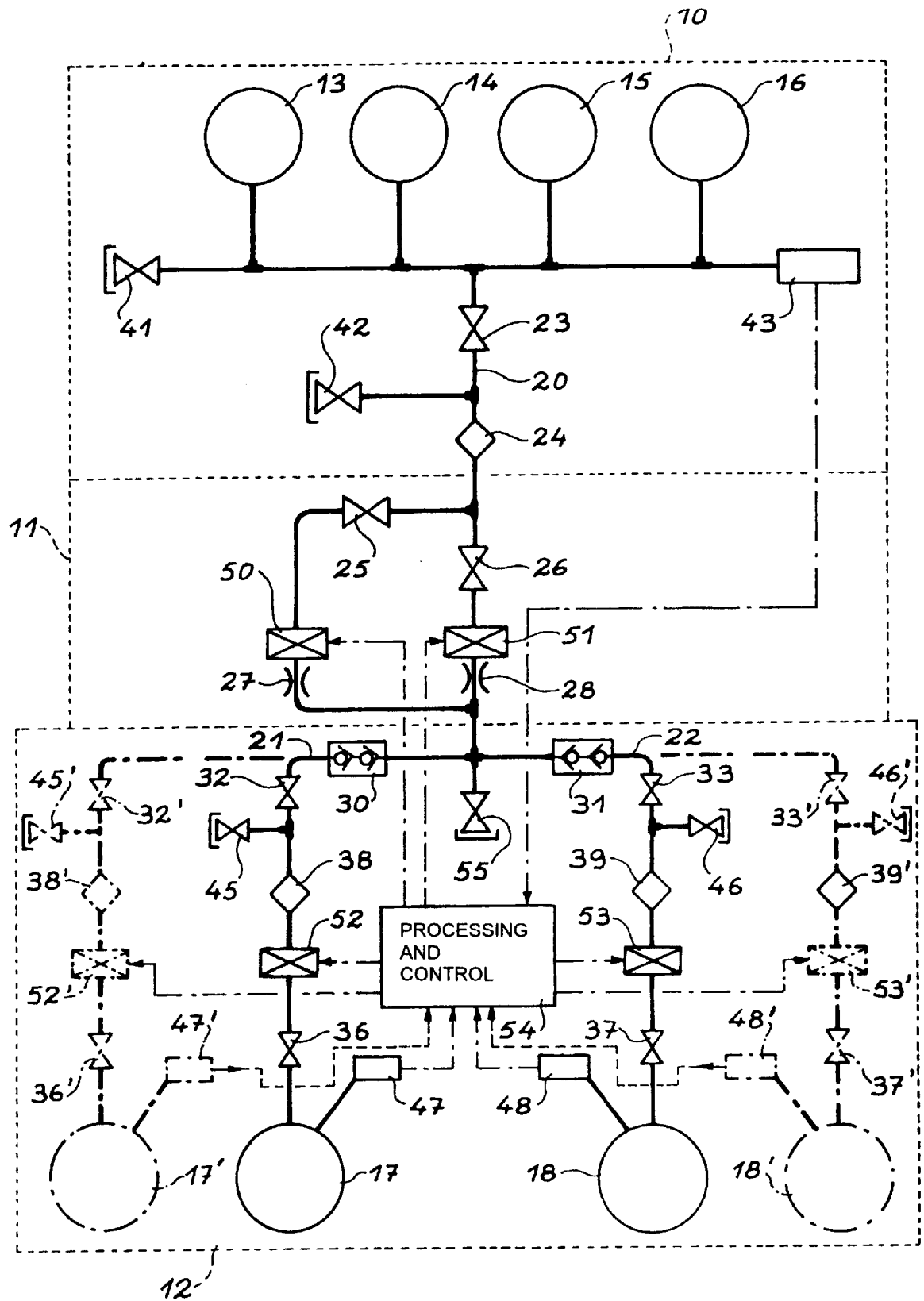
FIG. 1 diagrammatically illustrates the device according to the invention.

As shown in continuous line form in FIG. 1, the device according to the invention comprises:

a high pressure helium storage unit 10 in particular comprising the helium storage tanks 13, 14, 15 and 16, an electronic regulating unit 11, a pressurization unit 12 more particularly comprising two propellant tanks, namely a fuel tank 17 and an oxidizer tank 18.

The helium storage tanks 13, 14, 15 and 16 (here four in parallel) communicate with the fuel tank 17 and oxidizer tank 18 by lines 20, 21 and 22.

In the first line 20 is inserted a first pyrotechnic valve 23, a first filter 24, a second and a third pyrotechnic valves 25 and 26 in parallel, each being arranged in series with a calibrated leak element 27 and 28.

In each of the second and third lines 21 and 22 are inserted a check valve 30 and 31, a fourth pyrotechnic valve and a fifth pyrotechnic valve 32 and 36 separated by a second filter 38 (or a sixth and a seventh pyrotechnic valves 33 and 37 separated by a third filter 39).

The helium storage circuit 10 is completed by a ground filling and draining valve 41, a test connector 42 and a pressure sensor 43. The pressurization unit 12 is completed by test connectors 45, 46 and 55 and pressure sensors 47 and 48.

According to the invention, introduction takes place of several electrovalves 50, 51, 52 and 53 controlled by a processing and control circuit 54, at different locations of said circuit, respectively between the second 25 and third 26 pyrotechnic valve and the corresponding calibrated leak element 27 or 28, between the second filter 38 and the fifth pyrotechnic valve 36 and between the third filter 39 and the seventh pyrotechnic valve 37. The processing and control circuit 54 receives informations from the pressure sensors 43 associated with the helium tanks 13, 14, 15 and 16 and pressure sensors 47 and 48 associated with the propellant tanks 17 and 18.

However, it is pointed out that the invention also functions with a smaller number of valves (the valve 50 is here to ensure redundancy only and is not essential to the operation of the device). Moreover, the electrovalves 52 and 53 can function independently and consequently permit an individual and independent measurement of liquid quantities present in the tanks.

The filling valve 41 makes it possible to fill the helium tanks 13, 14, 15 and 16 on the ground at 300 bars, the first pyrotechnic valve 23 normally being closed, the remainder of the circuit remaining at low pressure. This valve is opened following the separation of the satellite from the launcher. The check valves 30 and 31 make it possible to avoid a mixture of the two propellants which would be explosive. The filters 24, 38 and 39 located at the outlet of the pyrotechnic valves protect the downstream circuits.

The fifth and seventh pyrotechnic valves 36 and 37 normally remain open to the end of the satellite life. They are only used in the case of a leak and an explosion risk, their firing making it possible to isolate the propellant tanks 17, 18 from the helium tanks 13, 14, 15 and 16.

It should be noted that the pyrotechnic valves, their number and their location are in particular dictated by safety considerations and the need to protect the firing site authorities on the ground.

The object of the device according to the invention is to ensure both a constant pressure pressurization function of the propellant tanks during the transfer and placing in position phase of the satellite and a repressurization or reinflation function of the propellant tanks permitting a measurement of residual propellant quantities during the orbital life phase.

The processing and control circuit 54 sends open/close instructions to the electrovalves in the pressurization circuit of the propellant tanks. Thus, during the satellite transfer and placing in position phase, following the bringing of the subsystem into configuration, the pressurization and maintenance thereof take place by means of electrovalves, whose open/close instructions are processed by the processing and control circuit by comparing data supplied by the pressure sensors with preset regulating thresholds, which can be optionally modified remotely.

Figure 2:
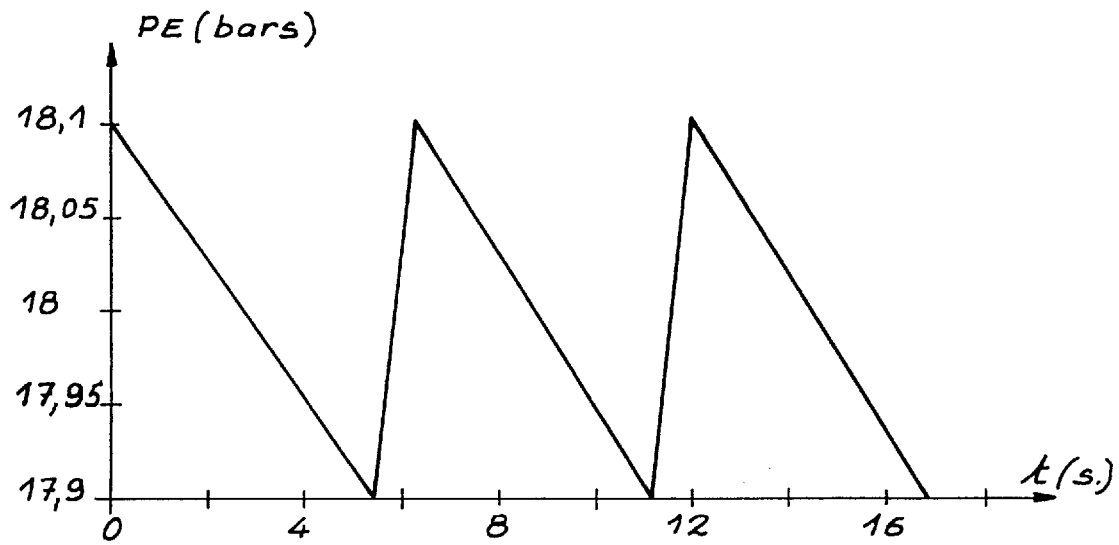
FIGS. 2 and 3 show curves illustrating the pressure evolution in the propellant tanks as a function of time.
Figure 3:
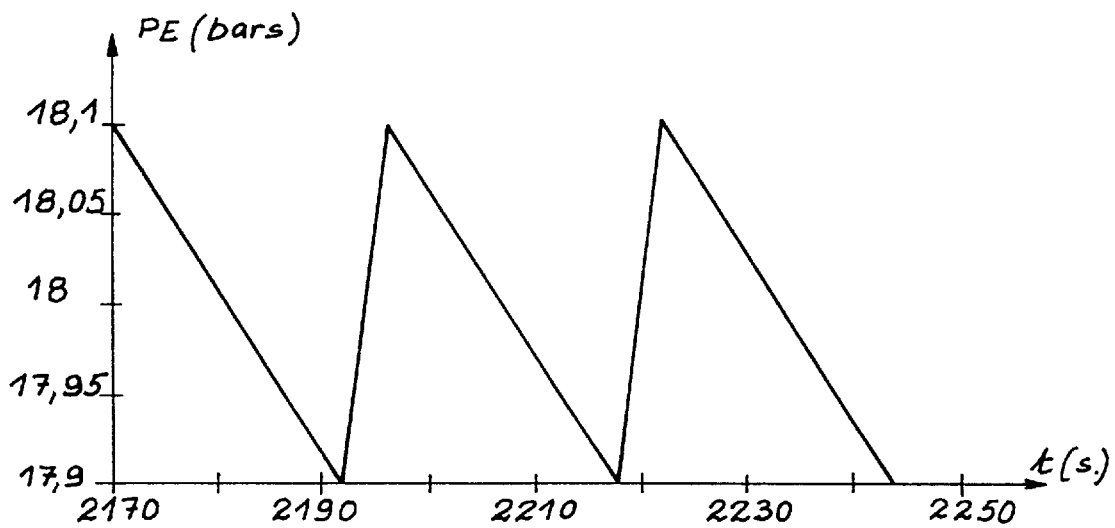

The curves giving the propellant pressure PE as a function of time t shown in FIGS. 2 and 3, illustrate the evolution of the control frequency of the regulating electrovalve 51 as a function of the time during the transfer phase and apogee manoeuvres, the gas volume in the propellant tanks being 100 litres in FIG. 2 and 400 litres in FIG. 3. This operating example is considered for regulating thresholds respectively fixed at 17.9 and 18.1.

Therefore the device according to the invention has two operating phases.

1. During the transfer and placing in position sequence

Following the placing in configuration of the subsystem, i.e. after opening the normally closed pyrotechnic shutoff valves (23, 26, 32, 33), the pressurization and the maintaining thereof throughout the transfer phase take place by means of electrovalves, whose open/close instructions are produced by the processing and control electronics on the basis of a comparison of data supplied by the pressure sensors with preregulated regulation thresholds. A failure of the nominal path or channel leads to the closing of the pyrotechnical valve (29) and the not necessarily simultaneous opening of the redundant channel (25).

2. In orbit

The electrovalves ensure the isolation of the high pressure helium part (in which there are only about 60 bars after the putting into position) from the propellant tanks with the requisite sealing level. The measurement of the residual propellants in each tank can take place at regular intervals during the orbital life. It consists of reintroducing helium into the propellant tanks by opening/closing electrovalves. Information on pressure variations supplied by the sensors then makes it possible to establish the free volume and consequently the liquid volume present in the propellant tanks.

The failure or sealing deficiency of valves, noted from the pressure sensors, leads to the closing of the pyrotechnic valves, which then totally isolates the helium circuit and there is a restoration to the configuration now existing on all subsystems evolving in the blow-down mode (decreasing pressure) during the orbital life.

In FIG. 1, completed with mixed line parts, is represented a variant of the device according to the invention with on this occasion several, e.g. two fuel tanks and several, e.g. two oxidizer tanks.

Elements identical to those of FIG. 1 described hereinbefore retain the same references. The new elements playing an equivalent part assume the same reference as the corresponding element, but followed by an apostrophe.

Figure 4:
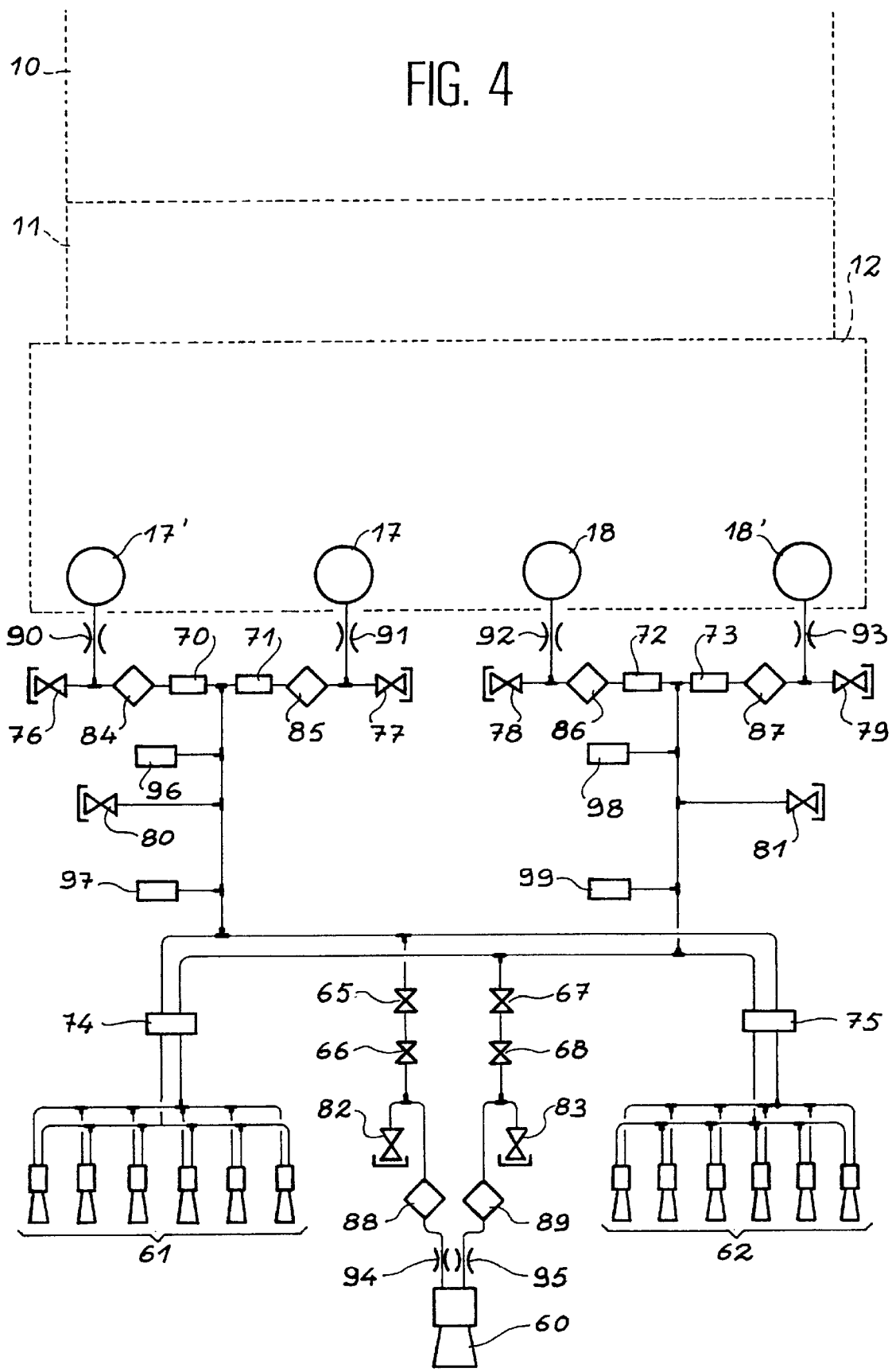
FIG. 4 relates to the liquid part of the propulsive subsystem located downstream of the device according to the invention, which is itself located in the gas pressurization part.

Thus, FIG. 4 shows the three units 10, 11 and 12 also shown in FIG. 1. However, the liquid apogee motor 60, the first engine group 61 and the second redundant engine group 62 are also shown. FIG. 4 also shows the different elements necessary for the supply of said motors and engines, namely:

pyrotechnic valves 65, 66, 67 and 68, shutoff valves 70, 71, 72, 73, 74 and 75, filling valves 76, 77, 78 and 79, test connectors 80, 81, 82, 83, filters 84, 85, 86, 87, 88 and 89, calibrated leak elements 90, 91, 92, 93, 94 and 95, pressure sensors 96, 97, 98 and 99.

In an operational example of the variant of the device according to the invention illustrated in FIGS. 1 (total) and 4, the following stages occur.

1. Initial stage

The helium pressure upstream of the first, normally closed pyrotechnic valve 23 is 300 bars. The circuit downstream of said valve and up to the shutoff valves 70, 71, 72 and 73, which are in the closed position, is under a helium pressure of approximately 4 bars. The tanks are 98% filled with propellants (for safety reasons on the ground in the case of a temperature rise). The remainder of the circuit is also pressurized under 4 bars helium. The shutoff valves 74 and 75, which in flight make it possible to select the functional branch or redundant branch, are closed.

2. Placing in configuration sequence

Following launcher separation, the following operations occur:

venting the lines or pipes, opening the pyrotechnics 36 and 37, opening the shutoff valves 74 and 75, opening the apogee motor valves 60 and one or both attitude engines for about 30 seconds.

The satisfactory performance of these operations is followed by the placing under pressure of lines and equipment:

filling lines with propellants (priming), opening the shutoff valves 72 and 73 (a single tank of each propellant), the pressure of the lines must be at approximately 4 bars (initial tank pressure):

pressurization of the subsystem, opening the shutoff valves 70 and 71, opening the pyrotechnic valves 32, 32', 33 and 33' (said valves being used for isolating the propellants from one another up to this time, after which the electrovalves 52, 52', 53 and 53'and the check valves 30 and 31 will fulfil this function), opening the valves 52, 52', 53 and 53', opening the pyrotechnic valve 23.

At this instant, the pressurization device is ready to operate.

There is a "regulated" pressure rise by starting the pressurization sequence. The comparison of the data from the sensors 47, 47', 48 and 48' with the reference threshold displayed in the processing and control electronics 54 (typically 18 bars) controls the opening and closing of the electrovalve 51. (which is coupled to a calibrated orifice). In the case of a failure, passage takes place to the redundant branch (closing the pyrotechnic valve 26, opening the pyrotechnic valve 25 and regulation by the electrovalve 50). The system is then operational and as from then on the engines can be used.

3. Geostationary orbit transfer phase

For the operation of the liquid apogee motor 60 during apogee manoeuvres, this phase requires that the pressure is regulated in the tanks. When a flow occurs, this regulation is ensured by the electrovalve 51 or electrovalve 50 on orders provided by the processing and control electronics 54. Between each apogee manoeuvre, the electrovalves 52, 52', 53 and 53' are closed again (although this is not strictly necessary).

4. Flight phase

At the end of the transfer phase on existing satellites, the pyrotechnic valves 36, 36', 37 and 37' are closed in order to definitively isolate the helium. As from then on the pressure will decrease in the tanks as the propellants are being consumed. With the device according to the invention, said valves are only used in the case of a failure and lead to the above configuration.

By programmed opening of e.g. electrovalve 51 and electrovalve 52', it is possible to reintroduce at regular intervals during the orbital life, helium into the tank 17'. The measurement of the pressure variations by the sensors 43 and 47' then gives information on the liquid quantity present in said tank. Symmetrical action takes place for the other tanks.

The same procedure can be applied to a subsystem having two tanks, as shown in continuous line form in FIG. 1.

We claim:

1. Device for pressurizing a standardized two-liquid propulsion system of a geostationary satellite comprising a high pressure helium storage unit having at least one helium storage tank; a pressurizing unit including propellant tanks; an electronic regulating unit interconnected to the propellant tanks by a pressurizing circuit and including at least one electrovalve coupled with a calibrated orifice, the regulating unit being positioned such that the electrovalve and calibrated orifice are between the high pressure unit and the propellant tanks; and a processing and control circuit controlling the electrovalve, the processing and control circuit receiving information from pressure sensors associated with the helium storage tank and the propellant tanks and providing a regulated pressure in the propellant tanks during a transfer orbit of the satellite and repressurization of the propellant tanks at any time during an orbit life of the satellite.

2. Device according to claim 1, wherein the propellant tanks include at least one fuel tank and an oxidizer tank.

3. Device according to claim 1 wherein the processing and control unit is adapted to regulate, during the transfer orbit, pressure level in the propellant tanks responsive to signals sent from earth.

4. Device according to claim 1 wherein the repressurization maintains a pressure difference between propellant tanks.

5. Device according to claim 1 wherein the repressurization permits measurement of residual liquid remaining in the propellant tanks.

6. Device according to claim 1 wherein the repressurization is achieved by causing a predetermined pressure increase in the propellant tanks.

7. Device according to claim 1 wherein the repressurization is achieved by opening the electrovalve at regular intervals.

8. Device according to claim 1, wherein the helium storage unit is completed by a ground filling and draining valve, a test connector and a pressure sensor.

9. Device according to claim 2 wherein the repressurization maintains a pressure difference between the oxidizer tank and the fuel tank so as to optimize propulsion system performance.

10. Device according to claim 2, wherein the helium storage tanks communicate with the first fuel tank and the first oxidizer tank by several lines, that in a first line is inserted a first pyrotechnic valve, a first filter, a second and a third pyrotechnic valve in parallel, each being placed in series with a calibrated leak element and in that in each of the second and third lines are inserted a check valve, a fourth or sixth pyrotechnic valve and a fifth or seventh pyrotechnic valve separated by a second or third filter.

11. Device according to claim 10, wherein the pressurization unit is completed by test connectors and pressure sensors.

12. Device according to claim 10, which comprises at least two fuel tanks and at least two oxidizer tanks, the elements of the second and third lines associated with the first fuel tank and first oxidizer tank then being duplicated in other lines for the other fuel tank(s) and oxidizer tank(s).

13. Device according to claim 10, wherein a first electrovalve is placed between the third pyrotechnic valve and the corresponding calibrated leak element and that two second electrovalves are respectively placed between the second filter and the fifth pyrotechnic valve and between the third filter and the seventh pyrotechnic valve.

14. Device according to claim 13, which comprises a redundant electrovalve placed between the second pyrotechnic valve and the corresponding calibrated leak element.

15. Device according to claim 13, wherein the two second electrovalves operate separately and thus permit an individual and independent measurement of liquid quantities present in the tanks.

* * * * *

UNITED STATES PATENT AND TRADEMARK OFFICE
CERTIFICATE OF CORRECTION

PATENT NO. : 5,880,356
DATED : March 9, 1999
INVENTOR(S) : Delepierre-Massue et al.

It is certified that error appears in the above-identified patent and that said Letters Patent is hereby corrected as shown below:

Column 2, Line 52, delete "the," and insert --the--.

Column 4, Line 31, after "regulator", add --.-- (period).

Column 7, Line 41, delete "51." and insert --51--.

Signed and Sealed this

Twenty-fourth Day of August, 1999

Attest:

Q. TODD DICKINSON

Attesting Officer

Acting Commissioner of Patents and Trademarks